(12) United States Patent
Lee et al.

(10) Patent No.: US 11,482,038 B2
(45) Date of Patent: Oct. 25, 2022

(54) VEHICLE AND METHOD OF CONTROLLING THE SAME

(71) Applicants: Hyundai Motor Company, Seoul (KR); Kia Corporation, Seoul (KR)

(72) Inventors: Jihye Lee, Whasung-Si (KR); Taeseung Kim, Whasung-Si (KR); Dong June Song, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/459,566

(22) Filed: Aug. 27, 2021

(65) Prior Publication Data

US 2022/0129656 A1 Apr. 28, 2022

(30) Foreign Application Priority Data

Oct. 26, 2020 (KR) ........................ 10-2020-0139454

(51) Int. Cl.
 *G06V 40/12* (2022.01)
 *G06V 40/13* (2022.01)

(52) U.S. Cl.
 CPC ...... *G06V 40/1376* (2022.01); *G06V 40/1306* (2022.01); *G06V 40/1359* (2022.01)

(58) Field of Classification Search
 CPC . G06V 40/1306; G06V 40/1347–1376; G06V 10/267; G06V 10/32; G06V 40/12–1394; G06V 10/98–993; G06V 40/00–70; B60R 25/00–406; B60R 25/25–257; G07C 9/00563; G07C 9/25; G07C 9/37; G07C 9/00–38; G07C 2209/00–65; E05B 85/70–78; G06K 9/00–0057; G06F 21/32; G06T 7/0002; G06T 5/00–50; G06T 2207/00–30268
 USPC .................................................. 382/124–127
 See application file for complete search history.

(56) References Cited

U.S. PATENT DOCUMENTS

| | | | | |
|---|---|---|---|---|
| 6,100,811 A | * | 8/2000 | Hsu .................... | B60R 25/2081 340/426.36 |
| 10,967,837 B1 | * | 4/2021 | Schulz ................ | B60R 25/1001 |
| 2012/0014570 A1 | * | 1/2012 | Abe .................... | G06V 40/1347 382/115 |

(Continued)

*Primary Examiner* — Amr A Awad
*Assistant Examiner* — Aaron Midkiff
(74) *Attorney, Agent, or Firm* — Morgan, Lewis & Bockius LLP

(57) ABSTRACT

A vehicle includes a first sensor including a capacitance sensor; a second sensor including an ultrasonic sensor; a storage configured to store ultrasonic pattern images; and a controller electrically connected to the first sensor, the second sensor and the storage and configured to: wake up the second sensor based on a user contiguous to the first sensor, obtain a fingerprint pattern image from the second sensor, according to a difference between an area value of a ridge area of the fingerprint pattern image and an area value of a valley area adjacent to the ridge area being less than a predetermined reference value, obtain result data by assigning a weight to the area value of the valley area, and according to the result data and the ultrasonic pattern image data matching more than a predetermined matching value by comparing the result data and ultrasonic pattern image data, recognize as a fingerprint corresponding to the user.

13 Claims, 12 Drawing Sheets

| 10-3a | | 11a-4 | | 20a | | |
|---|---|---|---|---|---|---|
| 20 | 25 | 25 | 10 | 3 | 9 | 8 |
| 34 | 40 | 9 | 23 | 21 | 24 | 28 |
| 35 | 7 | 27 | 27 | 31 | 24 | 23 |
| 5 | 32 | 18 | 24 | 34 | 40 | 41 |
| 31 | 35 | 38 | 39 | 38 | 39 | 40 |
| 8 | 48 | 19 | 28 | 26 | 32 | 28 |
| 7 | 26 | 22 | 6 | 30 | 31 | 10 |
| 29 | 27 | 20 | 9 | 8 | 7 | 37 |

12-3a

(56) References Cited

U.S. PATENT DOCUMENTS

| | | | |
|---|---|---|---|
| 2014/0028439 A1* | 1/2014 | Lien | G06V 40/1365 340/5.53 |
| 2014/0133711 A1* | 5/2014 | Abe | G06V 10/993 382/115 |
| 2016/0042219 A1* | 2/2016 | Bae | G06V 40/70 382/124 |
| 2017/0220836 A1* | 8/2017 | Phillips | G06V 40/1376 |
| 2018/0196988 A1* | 7/2018 | Tse | G06F 21/32 |

* cited by examiner

FIG. 5A

| 11 | 13 | 13 | 10 |
|----|----|----|----|
| 17 | 20 | 9  | 12 |
| 18 | 7  | 14 | 14 |
| 5  | 16 | 9  | 12 |
| 15 | 17 | 19 | 20 |
| 8  | 25 | 11 | 14 |
| 7  | 13 | 11 | 6  |
| 11 | 14 | 11 | 9  |

10a-1, 11a-1, 12a-1

| 3  | 9  | 8  |
|----|----|----|
| 21 | 24 | 28 |
| 30 | 23 | 22 |
| 34 | 40 | 41 |
| 38 | 39 | 40 |
| 26 | 32 | 13 |
| 30 | 31 | 10 |
| 8  | 7  | 17 |

| 22 | 26 | 26 | 10 |
|----|----|----|----|
| 34 | 40 | 9  | 24 |
| 36 | 7  | 28 | 28 |
| 5  | 32 | 18 | 24 |
| 30 | 34 | 38 | 40 |
| 8  | 50 | 22 | 28 |
| 7  | 26 | 22 | 6  |
| 22 | 28 | 22 | 9  |

| 3  | 9  | 8  |
|----|----|----|
| 42 | 48 | 56 |
| 60 | 46 | 44 |
| 68 | 80 | 82 |
| 76 | 78 | 80 |
| 52 | 64 | 26 |
| 60 | 62 | 10 |
| 8  | 7  | 34 |

| | 10a | 11a | | | 20a | |
|---|---|---|---|---|---|---|
| 11 | 13 | 13 | 10 | 3 | 9 | 8 |
| 17 | 20 | 9 | 12 | 21 | 24 | 28 |
| 18 | 7 | 14 | 14 | 30 | 23 | 22 |
| 5 | 16 | 9 | 12 | 34 | 40 | 41 |
| 15 | 17 | 19 | 20 | 38 | 39 | 40 |
| 8 | 25 | 11 | 14 | 26 | 32 | 13 |
| 7 | 13 | 11 | 6 | 30 | 31 | 10 |
| 11 | 14 | 11 | 9 | 8 | 7 | 17 |

| 22 | 26 | 26 | 10 |
|----|----|----|----|
| 34 | 40 | 9  | 24 |
| 36 | 7  | 28 | 28 |
| 5  | 32 | 18 | 24 |
| 30 | 34 | 38 | 40 |
| 8  | 50 | 22 | 28 |
| 7  | 26 | 22 | 6  |
| 22 | 28 | 22 | 9  |

| 3  | 9  | 8  |
|----|----|----|
| 21 | 24 | 28 |
| 30 | 23 | 22 |
| 34 | 40 | 41 |
| 38 | 39 | 40 |
| 26 | 32 | 13 |
| 30 | 31 | 10 |
| 8  | 7  | 17 |

| | 10c | | 11c |
|---|---|---|---|
| 13 | 18 | 18 | 10 |
| 27 | 33 | 9 | 21 |
| 28 | 7 | 25 | 25 |
| 5 | 30 | 16 | 22 |
| 29 | 33 | 35 | 37 |
| 8 | 41 | 12 | 21 |
| 7 | 19 | 15 | 6 |
| 22 | 20 | 13 | 9 |

12c

20c

| 3 | 9 | 8 |
|---|---|---|
| 18 | 21 | 25 |
| 25 | 18 | 17 |
| 28 | 34 | 35 |
| 33 | 34 | 35 |
| 22 | 28 | 24 |
| 27 | 28 | 6 |
| 8 | 7 | 35 |

FIG. 7B

| 20 | 25 | 25 | 10 |
|---|---|---|---|
| 34 | 40 | 9 | 23 |
| 35 | 7 | 27 | 27 |
| 5 | 32 | 18 | 24 |
| 31 | 35 | 38 | 39 |
| 8 | 48 | 19 | 28 |
| 7 | 26 | 22 | 6 |
| 29 | 27 | 20 | 9 |

| 3 | 9 | 8 |
|---|---|---|
| 21 | 24 | 28 |
| 31 | 24 | 23 |
| 34 | 40 | 41 |
| 38 | 39 | 40 |
| 26 | 32 | 28 |
| 30 | 31 | 10 |
| 8 | 7 | 37 |

10-3a
11a-4
20a
12-3a

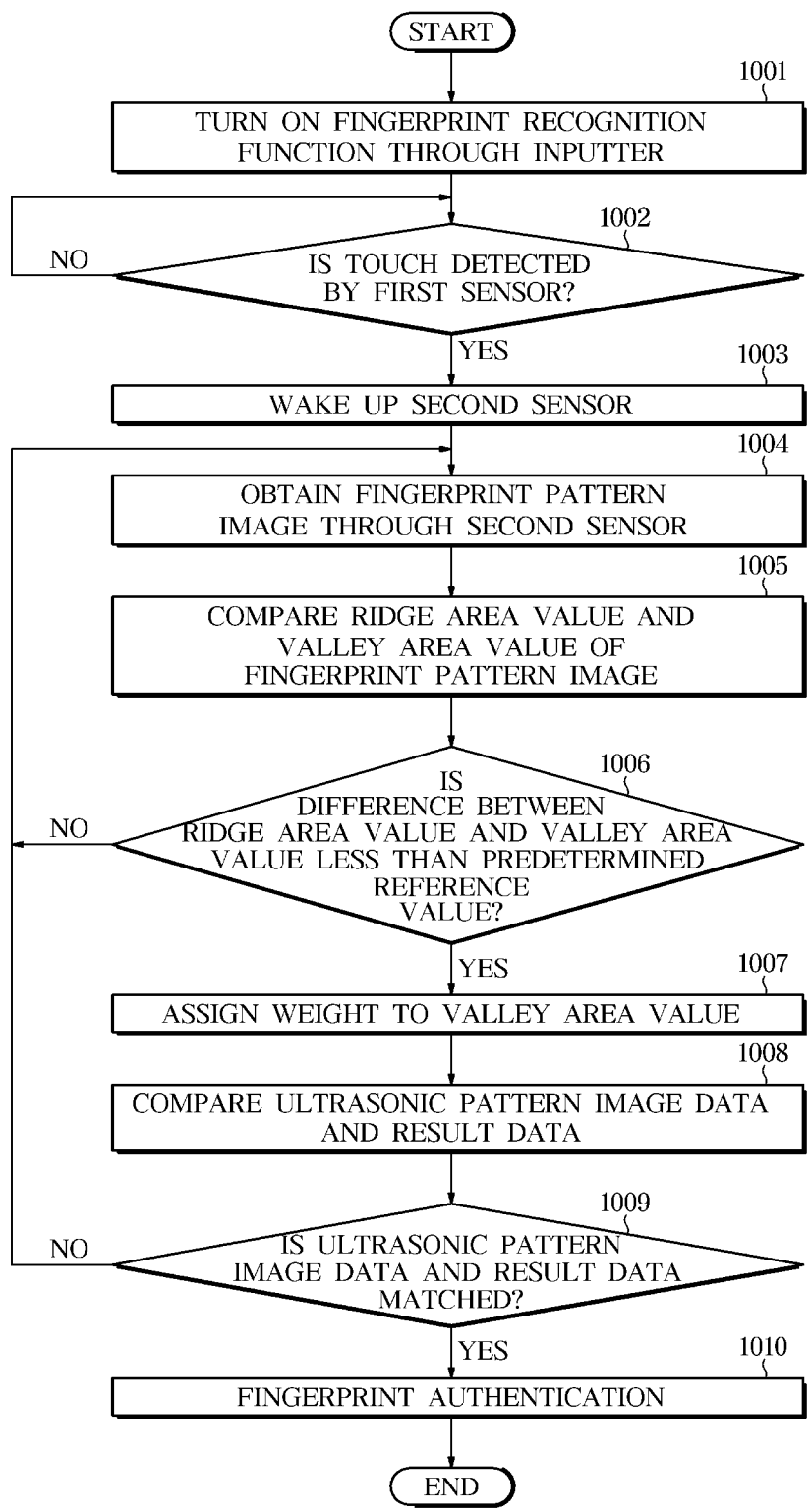

VEHICLE AND METHOD OF CONTROLLING THE SAME

CROSS-REFERENCE TO RELATED APPLICATION(S)

The present application claims priority to Korean Patent Application No. 10-2020-0139454, filed on Oct. 26, 2020, the entire contents of which is incorporated herein for all purposes by this reference.

BACKGROUND OF THE INVENTION

Field of the Invention

The present invention relates to a vehicle and a method of controlling the vehicle.

Description of Related Art

Recently, the vehicle industry is actively conducting research on a technology to open a door through a smart key or fingerprint recognition. In particular, in the case of fingerprint recognition, a person maintains the same type of fingerprint, and a probability of having the same type of fingerprint as others is only 1 in 1 billion, so it is an important technology used to determine whether it is the person. However, in the case of fingerprint recognition, there may be various variable factors in recognizing a user's fingerprint. Among them, when the fingerprint recognition is attempted in rainy weather, the user's fingerprint is not recognized frequently due to rainwater.

To solve this problem, a related research is being actively conducted to smoothly recognize the user's fingerprint even in rain. The present invention is directed to providing a technology that can accurately determine whether the person is in the rain.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle configured for accurately determining whether it is a person even in the rain by comparing information obtained through an ultrasonic sensor with reference information and recognizing a fingerprint through certain correction, and a method of controlling the vehicle.

Additional aspects of the present invention will be set forth in part in the description which follows, and in part, will be obvious from the description, or may be learned by practice of the present invention.

According to various aspects of the present invention, there is provided a vehicle including: a first sensor including a capacitance sensor; a second sensor including an ultrasonic sensor; a storage configured to store ultrasonic pattern images; and a controller electrically connected to the first sensor, the second sensor and the storage and configured to: wake up the second sensor in response to a user's touching the first sensor, obtain a fingerprint pattern image from the second sensor, according to a difference between an area value of a ridge area of the fingerprint pattern image and an area value of a valley area adjacent to the ridge area being less than a predetermined reference value, obtain result data by assigning a weight to the area value of the valley area so that the difference between the area value of the ridge area and the area value of the valley area in the fingerprint pattern image increases, and according to the result data and the ultrasonic pattern image data matching more than a predetermined matching value by comparing the result data and ultrasonic pattern image data, recognize as a fingerprint corresponding to the user.

The vehicle may further include an inputter electrically connected to the controller and configured to receive the user's input to turn on a fingerprint recognition function. According to the user's setting to wake up the fingerprint recognition function through the inputter, the controller may be configured to receive the fingerprint pattern image from the second sensor.

The first sensor may include a first capacitance sensor and a second capacitance sensor. The first sensor and the second sensor are spaced from a handle.

The storage may be configured to store at least one of water contact value pattern images and air contact value pattern images.

The controller may be configured to assign the weight to the area value of the valley area corresponding to the difference between the area value of the valley area of the fingerprint pattern image and the area value of the ridge area being less than the predetermined reference value.

The controller may be configured to assign a greater weight to a valley area value of an internal region of the fingerprint pattern image than a valley area value of an external region of the fingerprint pattern image.

According to various aspects of the present invention, there is provided a method of controlling a vehicle including: storing, by a storage, ultrasonic pattern images; waking up, by a controller electrically connected to the storage, a second sensor in a response to a user's touching a first sensor, wherein the first sensor and the second sensor are electrically connected to the controller; obtaining, by the controller, a fingerprint pattern image of the user from the second sensor; according to a difference between an area value of a ridge area of the fingerprint pattern image and an area value of a valley area adjacent to the ridge area being less than a predetermined reference value, obtaining, by the controller, result data by assigning a weight to the area value of the valley area so that the difference between the area value of the ridge area and the area value of the valley area in the fingerprint pattern image increases; and according to the result data and the ultrasonic pattern image data matching more than a predetermined matching value by comparing the result data and ultrasonic pattern image data, recognizing, by the controller, as a fingerprint corresponding to the user.

The method may further include receiving, by an inputter electrically connected to the controller, the user's input to turn on a fingerprint recognition function of the controller; and according to the user's setting to wake up the fingerprint recognition function through the inputter, receiving, by the controller, the fingerprint pattern image from the second sensor.

The waking up of the second sensor may include detecting the user's touch through the first capacitance sensor 401 and the second capacitance sensor 401 included in the first sensor. The first sensor and the second sensor are spaced from a handle.

The storing of the ultrasonic pattern images may include storing at least one of water contact value pattern images and air contact value pattern images in the storage.

The assigning of the weight may include assigning the weight to the area value of the valley area corresponding to the difference between the area value of the valley area of the fingerprint pattern image and the area value of the ridge area being less than the predetermined reference value.

The assigning of the weight may include assigning a greater weight to a valley area value of an internal region of the fingerprint pattern image than a valley area value of an external region of the fingerprint pattern image.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5A and FIG. 5B are views exemplarily illustrating an operation of assigning a weight to area values of a valley area of a fingerprint pattern image according to various exemplary embodiments of the present invention.

FIG. 6A and FIG. 6B are views exemplarily illustrating an operation of assigning a weight to area values of a valley area in which a difference from area values of an adjacent ridge area among area values of the valley area of a fingerprint pattern image is less than a predetermined reference value, according to various exemplary embodiments of the present invention.

FIG. 7A and FIG. 7B are views exemplarily illustrating an operation of assigning different weights according to areas to area values of a valley area of a fingerprint pattern image, according to various exemplary embodiments of the present invention.

FIG. 8 is a flowchart according to various exemplary embodiments of the present invention.

Figure 1:
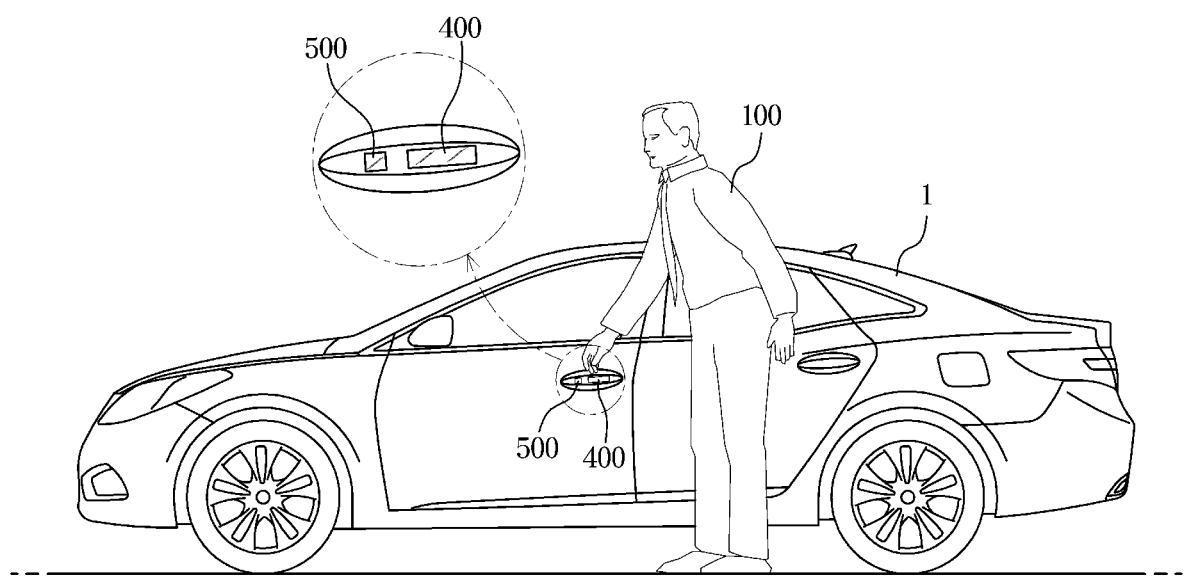
FIG. 1 is a view exemplarily illustrating an operation of authenticating a user's fingerprint according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. Not all elements of the exemplary embodiments of the present invention will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

Furthermore, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the present invention will be described with reference to accompanying drawings.

Figure 2:
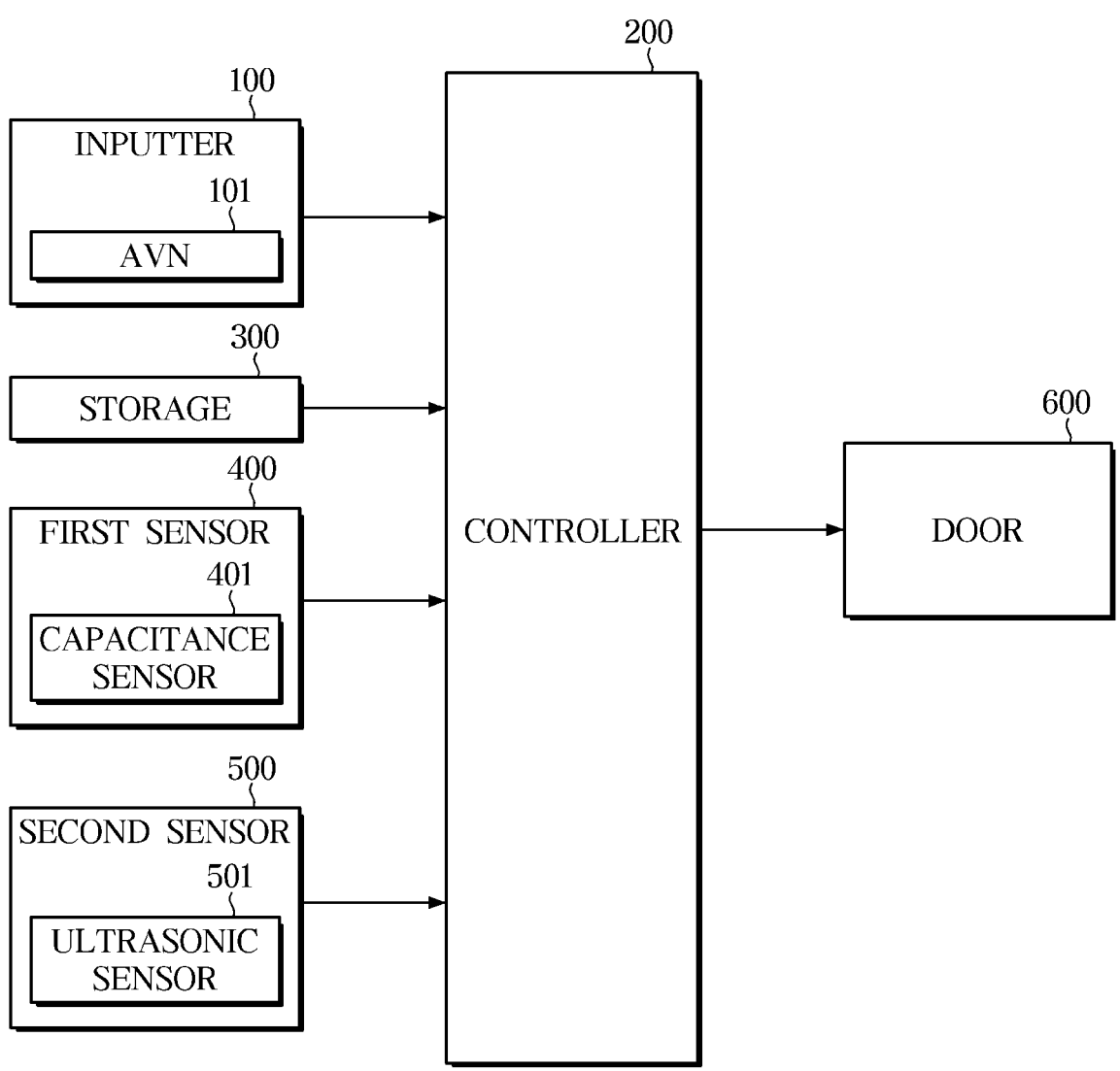
FIG. 2 is a control block diagram according to various exemplary embodiments of the present invention.

FIG. 1 is a view exemplarily illustrating an operation of authenticating a user's fingerprint according to various exemplary embodiments of the present invention, and FIG. 2 is a control block diagram according to various exemplary embodiments of the present invention.

Referring to FIG. 1 and FIG. 2, a vehicle 1 may include a first sensor 400 including a capacitance sensor 401, a second sensor 500 including an ultrasonic sensor, a storage 300 for storing an ultrasonic pattern image indicating a detected value for each position within the obtained fingerprint contact area, an inputter 100, which receives a user input to turn on a fingerprint recognition function of the controller, and a controller 200.

The controller 200 may wake up the second sensor 500 based on touch information obtained from the first sensor 400, obtain a fingerprint pattern image indicating an area value for each position within the user's fingerprint contact area through the second sensor 500. When a difference between an area value of a ridge area of the fingerprint pattern image and an area value of a valley area adjacent to the ridge area of the fingerprint pattern image is less than a predetermined reference value, the controller 200 may obtain result data by adding a weight to the area value of the valley area so that the difference between the area value of the ridge area in the fingerprint pattern image and the area value of the valley area adjacent to the ridge area increases, and may authenticate a fingerprint by comparing the result data with the ultrasound pattern image. When the user sets the fingerprint recognition function to wake up through the inputter 100, the controller 200 may control to obtain the fingerprint pattern image through the second sensor 500.

The inputter 100 may include an Audio Video Navigation (AVN) and a cluster.

The inputter 100 may include hardware devices such as various buttons or switches, pedals, keyboards, mice, trackballs, various levers, handles, sticks, or the like for user input.

Furthermore, the inputter 100 may include a graphical user interface (GUI) such as a touch pad for user input, that is, a software device. The touch pad may be implemented as a touch screen panel (TSP) to form a mutual layer structure with a display.

The first sensor 400 may include a capacitance sensor 401. Touch information may detect a touch based on an electromotive force through a human body, and may detect a surface power through charging and discharging of a capacitor when the capacitance sensor 401 is touched by a human hand. Furthermore, the human hand may be recognized in various ways. The capacitance sensor 401 may use a pressure sensor, and the touch information may be obtained based on a pressure input by the human hand. The capacitance sensor 401 may be located on a handle of the vehicle 1.

Furthermore, the capacitance sensor 401 may be located in various places in the vehicle 1. The capacitance sensor 401 may include a first capacitance sensor and a second capacitance sensor. The first capacitance sensor and the second capacitance sensor may be located outside and inside the handle of the vehicle 1. The first capacitance sensor may be located inside the handle of the vehicle 1 to open the door of the vehicle 1, and the second capacitance sensor may be located outside the handle of the vehicle 1 to close the door of the vehicle 1.

The first sensor 400 may wake up the second sensor 500. Waking up may refer to turning on functions of the second sensor 500. The second sensor 500 may include an ultrasonic sensor 501. In case of contact with the second sensor 500, an ultrasonic signal is transmitted through the second sensor 500, and the transmitted signal is again received by the ultrasonic sensor 501.

A measurement of an ultrasonic energy may be measured by pMUT (Piezoelectric Micromachined Ultrasonic Transducers). The ultrasound signal is transmitted and received for each pMUT to recognize a user's fingerprint and to obtain the fingerprint pattern image.

Furthermore, the second sensor 500 may include various sensors commonly used for fingerprint recognition. The second sensor 500 may be located on the handle of the vehicle 1. In the instant case, the second sensor 500 may be located at a position spaced from the first sensor 400. Furthermore, the second sensor 500 may be located at the same position as the first sensor 400.

The storage 300 may include at least one of a water contact value pattern image and an air contact value pattern image, and may store the ultrasonic pattern image.

The ultrasonic pattern image may refer to an energy pattern image per pMUT of a previously obtained fingerprint. The ultrasonic pattern image may be obtained in advance from a user. The previously obtained method may be obtained in various commonly used methods. The fingerprint pattern image may recognize the user's fingerprint through the second sensor 500 and may refer to an area value for each position according to a position within a contact area of the recognized fingerprint.

The area value in the fingerprint pattern image may include data values of ridge (sensor contact surface) and valley (sensor non-contact surface) obtained through the ultrasonic sensor 501. The area including the data value of the ridge (sensor contact surface) in the fingerprint pattern image may refer to the area value of the ridge area, and the area including the data value of the valley in the fingerprint pattern image may refer to the area value of the valley area. Here, the area value may refer to an energy value obtained through the ultrasonic sensor of the area.

When the difference between the area value of the ridge area of the fingerprint pattern image and the area value of the valley area of the fingerprint pattern image is less than a predetermined reference value, the controller 200 may add a certain weight to the area value for each position in the user fingerprint pattern image and obtain the result data. This will be described in detail later.

The controller 200 may compare the result data and the ultrasonic pattern image data. When the result data and the ultrasonic pattern image data match more than a predetermined matching value, the controller 200 may recognize as the fingerprint corresponding to the user. The predetermined matching value may refer to a minimum value for recognizing the same fingerprint when the result data and the ultrasonic pattern image data are matched to a certain level or more. The predetermined matching value may refer to authenticating the fingerprint by clearly distinguishing the valley and the ridge of the fingerprint pattern image due to the difference between the area value of the ridge area and the area value of the valley area of the fingerprint pattern image.

The controller 200 is a processor that controls all operations of the vehicle 1, and may be a processor of an electronic control unit (ECU) that controls overall operations of the power system. Furthermore, the controller 200 may control operations of various modules and devices built into the vehicle 1. According to various exemplary embodiments of the present invention, the controller 200 may generate control signals for controlling various modules, devices, etc. built in the vehicle 1 to control the operation of each component.

Furthermore, the controller 200 may include a memory in which programs that perform operations described above and below and various data related thereto are stored, and a processor that executes programs stored in the memory. Furthermore, the controller 200 may be integrated into a System On Chip (SOC) built into the vehicle 1 and may be operated by the processor. However, since there is not only one SOC embedded in the vehicle 1, but may be a plurality of SOCs, it is not limited to being integrated into only one SOC.

The controller 200 may be implemented through at least one type of storage medium such as Flash memory type, Hard disk type, Multimedia card micro type, Card type of memory (e.g., SD or XD memory, etc.), RAM (Random Access Memory: RAM), Static Random Access Memory (SRAM), ROM (Read-Only Memory), EEPROM (Electrically Erasable Programmable Read-Only Memory), PROM (Programmable Read-Only Memory), Magnetic memory, Magnetic disk. However, it is not limited thereto, and may be implemented in any other form known in the art.

At least one component may be added or omitted to correspond to the performances of the components of the vehicle 1 illustrated in FIG. 2. Furthermore, the mutual positions of the components may be changed to correspond to the performance or structure of the system.

Some of the components illustrated in FIG. 2 may refer to a software component and/or a hardware component, such as a Field Programmable Gate Array (FPGA) and an Application Specific Integrated Circuit (ASIC).

Figure 3:
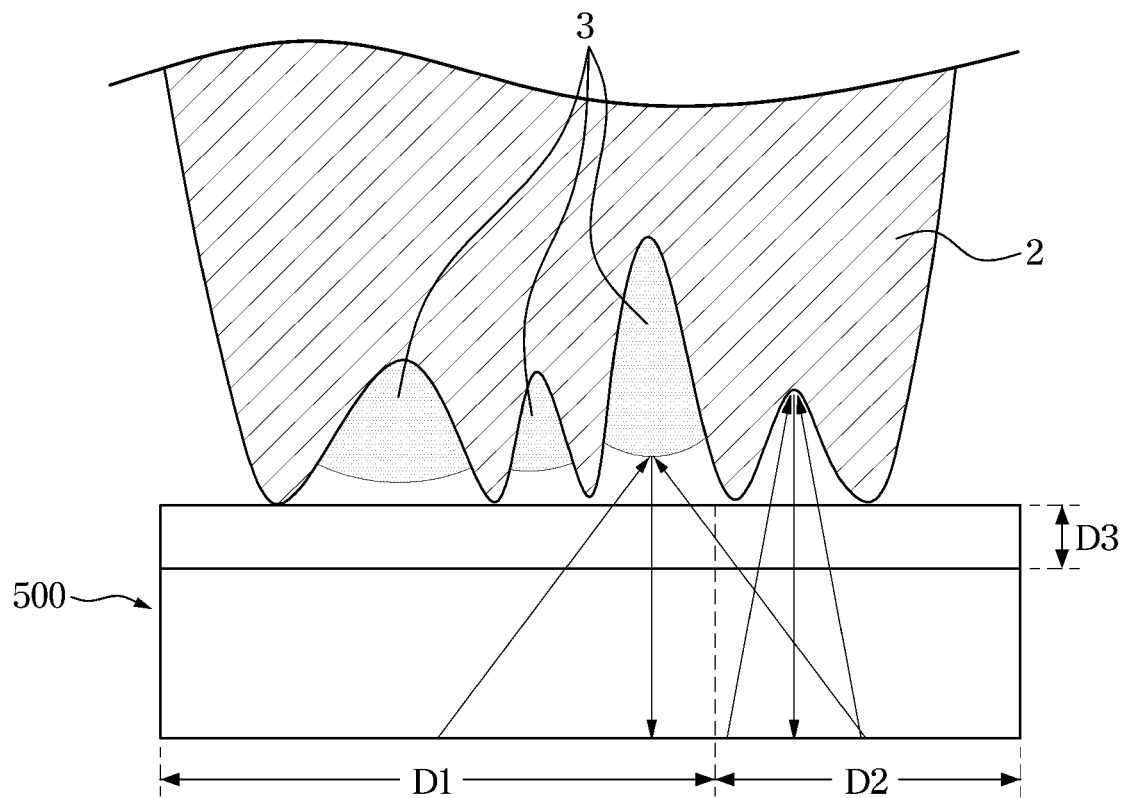
FIG. 3 is a view exemplarily illustrating an operation of recognizing a fingerprint using an ultrasonic sensor according to various exemplary embodiments of the present invention.

FIG. 3 is a view exemplarily illustrating an operation of recognizing a fingerprint using an ultrasonic sensor according to various exemplary embodiments of the present invention.

Referring to FIG. 3, a ridge portion in direct contact with the ultrasonic sensor 501 and a valley portion having a certain amount of space exist in a human fingerprint 2. The human fingerprint 2 has a unique ridge and valley shape, so that the human fingerprint 2 may be recognized by feature points of the fingerprint 2. Furthermore, in recognizing the human fingerprint 2, an area of the fingerprint 2 may be compared. The ridge portion of the human fingerprint 2 does not significantly change a value recognized by ultrasonic even if water 3 is immersed. On the other hand, the valley portion in the human fingerprint 2 is wet with the water 3, a space between the ultrasonic sensor 501 and the valley portion is filled with the water 3, and thus the detected value may change significantly. The value recognized by the ultrasonic sensor 501 may be variously measured by a cover material located on a top portion of the ultrasonic sensor 501.

When the ultrasonic sensor detects a finger, the portion D1 with water 3 on the finger and the portion D2 without water 3 are compared. When the ultrasonic signal is transmitted to the valley portion of the portion D1 with water 3, a time is shorter than when the ultrasonic signal is transmitted to the valley portion due to the water 3, and the signal is received, and the ultrasonic energy of the corresponding portion is measured smaller. Transmitting the ultrasonic signal to the valley portion of the portion D2 not wet with water 3 and receiving the signal normally reaches the valley portion, and the signal is received, so that the signal is not further shortened and the ultrasonic energy of the corresponding portion may be measured as it was. Therefore, even if the same fingerprint 2 is applied, the ultrasonic area value may be measured differently between the portion D1 which is wet with the water 3 and the portion D2 which is not wet with the water 3. A cover material D3 of the ultrasonic sensor 501 may be made of various materials, and an energy derived value may vary depending on the material.

Figure 4A:
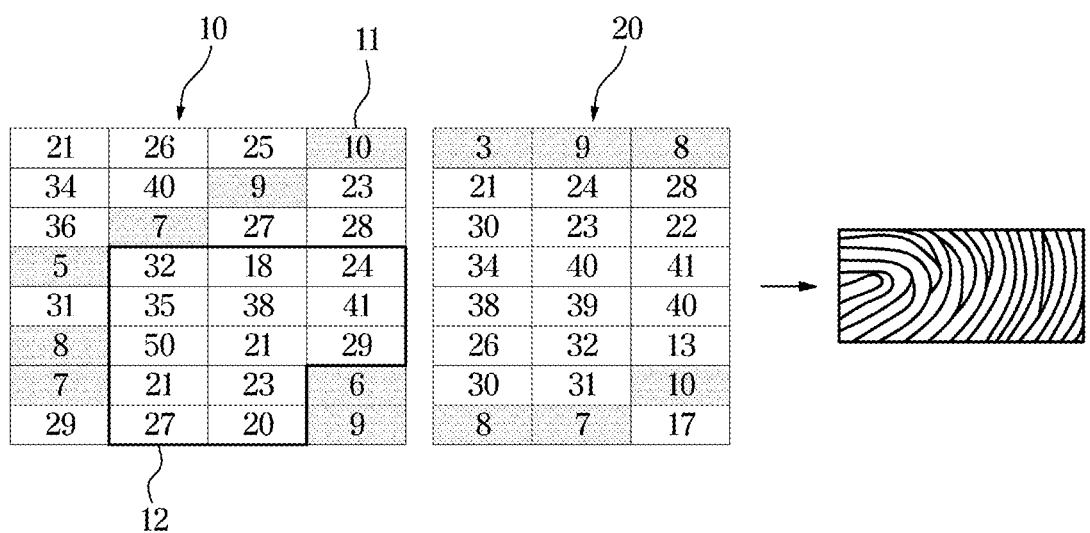
FIG. 4A and FIG. 4B are views exemplarily illustrating an operation of obtaining a fingerprint pattern image according to various exemplary embodiments of the present invention.
Figure 4B:
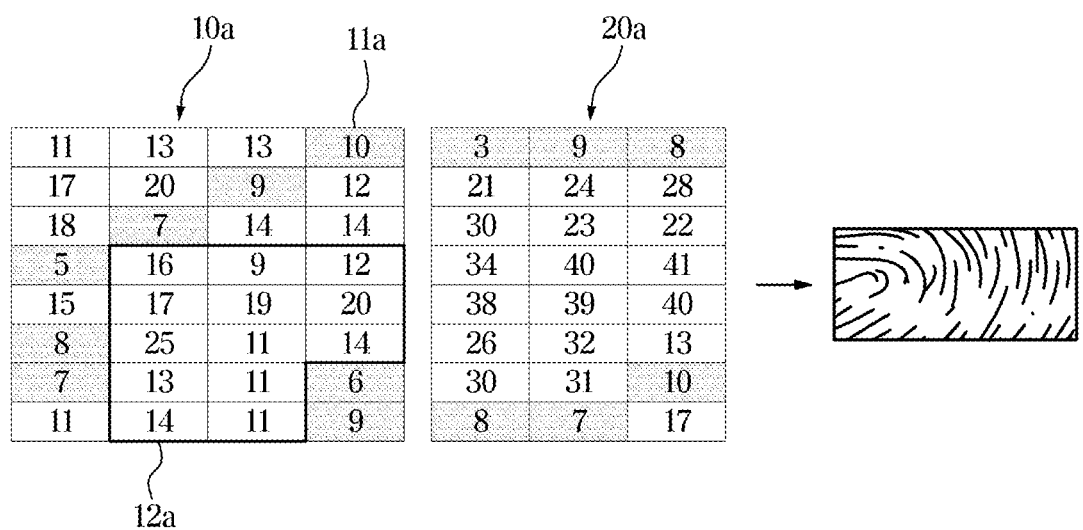

FIG. 4A and FIG. 4B are views exemplarily illustrating an operation of obtaining a fingerprint pattern image according to various exemplary embodiments of the present invention.

Referring to FIG. 4A and FIG. 4B, when the fingerprint of the finger is not wet with water, the area value corresponding to positions of the ridge and the valley may be clearly distinguished. In the fingerprint pattern image, an area value 11 of the ridge area is relatively much lower than that of the valley, whereas the area value 12 of the valley area may have relatively high energy. However, looking at a case of a rainy day, there may be a portion 10 where water is applied to the fingerprint of the finger and a portion 20 which is not wet with water. Looking at the portion 10 where the fingerprint is stained with water, an area value 11*a* of the ridge portion in the fingerprint pattern image may be maintained almost constant, whereas an area value 12*a* of the valley portion is greatly decreased. In the instant case, except for the part corresponding to the ridge area in FIG. 4A and FIG. 4B, all may correspond to the valley area. On the other hand, it may be seen that areas 20*a* and 20*a*-1 not covered with water have a constant area value.

FIG. 5A and FIG. 5B are views exemplarily illustrating an operation of assigning a weight to area values of a valley area of a fingerprint pattern image according to various exemplary embodiments of the present invention.

The controller 200 may assign a weight to the area value of the valley area of the fingerprint pattern image. Looking at the portion 10*a* where the user's fingerprint is wet, the area value 11*a* of the ridge area of the fingerprint pattern image is similar to the case where the fingerprint is not wet with water, but the area value 12*a* of the valley portion may appear significantly lower than a case where the fingerprint is not covered with water. The case where the water is not attached is exemplified in FIG. 4A and FIG. 4B. In the case of water, the difference between the area value of the ridge area and the area value of the valley area is too small, so that the fingerprint may not be recognized properly. Therefore, in the case of adding the weight to the area value of the valley area of the fingerprint pattern image, a process of correcting the difference between the area value of the ridge area and the area value of the valley area may be increased. The weight may refer to correction that increases the certain value. A weight value may be arbitrarily determined.

In the case of FIG. 5A and FIG. 5B, the weight value multiplied by 2 is exemplified. Since there may be a case where there is almost no water-free portion, it is possible to perform correction in which the weight is added to both the water-applied portion and the non-water-applied portion. Referring to FIG. 5B, the weight was added so that all the area values corresponding to the valley area were doubled compared to that of FIG. 5A. Due to the provided configuration, the difference between the area value of the valley area and the area value of the ridge area becomes clear, so that the fingerprint may be authenticated more accurately.

FIG. 6A and FIG. 6B are views exemplarily illustrating an operation of assigning a weight to area values of a valley area in which a difference from area values of an adjacent ridge area among area values of the valley area of a fingerprint pattern image is less than a predetermined reference value, according to various exemplary embodiments of the present invention.

FIG. 5A and FIG. 5B exemplify an operation of adding the weight not only to the valley area where the user's fingerprint is covered with water, but also to the valley area where the user's fingerprint is not covered with water.

Referring to FIG. 6A and FIG. 6B, there may be the portion 10*a* where water is applied to the user's fingerprint and the portion 20*a* where water is not attached to the user's fingerprint. In the instant case, when adding the weight to the area value 12*a* of the valley area of the user's fingerprint pattern image, adding the weight only to the water-stained portion 10*a* may derive to more accurate results. To the present end, it is necessary to distinguish the water-stained portion 10*a* and the non-water-stained portion 20*a*. When the difference between the area value 12*a* of the valley area of the fingerprint pattern image and the area value 11*a* of the ridge area adjacent to the valley area is less than a predetermined reference value, it is determined that the fingerprint is the portion where water is applied, and the result may be determined by adding the weight to only the area value 12*a*-2 of the valley area of the part where water is applied. At the instant time, it may be seen that the area value of the non-water portion 20a-2 is maintained constant. Less than the predetermined reference value may refer to that the difference between the area value of the ridge area and the area value of the valley area is less than the certain level.

FIG. 7A and FIG. 7B are views exemplarily illustrating an operation of assigning different weights according to areas to area values of a valley area of a fingerprint pattern image, according to various exemplary embodiments of the present invention.

Referring to FIG. 7A and FIG. 7B, in a case of a portion 10c where the fingerprint is wetted with water, the area value of the valley area located outside an internal portion of the fingerprint may drop more significantly. In the instant case, it is necessary to add a small weight to the area value of the valley area located inside the fingerprint, and to add a large weight to the area value of the valley area located outside the fingerprint. For example, as illustrated in FIG. 7A and FIG. 7B, a method of adding a weight of 5 to the area value of the internal valley area of the fingerprint and adding a weight of 10 to the area value of the external valley area of the fingerprint may be performed. The inside and outside of the fingerprint may refer to the inside and outside of the ridge areas based on the fingerprint pattern image, may be determined as the inside of the center portion of the user's finger portion, and may be determined as a distance from a center portion of the user's finger is outward.

FIG. 8 is a flowchart according to various exemplary embodiments of the present invention.

Referring to FIG. 8, the fingerprint recognition function may be turned on through the inputter 100 (1001). Afterwards, the first sensor 400 may detect a user's touch (1002), and when it is detected, the second sensor 500 is woken up (1003), and when it is not detected, the fingerprint recognition function is maintained in an on state.

When the second sensor 500 wakes up, the fingerprint pattern image may be obtained through the second sensor 500 (1004). Thereafter, the area value of the ridge area of the fingerprint pattern image and the area value of the valley area may be compared (1005). The comparison method is as described above. By comparing the area values, it is determined whether the difference between the area value of the ridge area and the area value of the valley area is less than the predetermined reference value (1006), and if it is less than, the weight is assigned to the area value of the valley area of the fingerprint pattern image (1007).

The method of assigning the weight to the area value of the valley area of the fingerprint pattern image is as described above. By weighting the area value of the valley area of the fingerprint pattern image, the result data may be obtained, and the result data and the ultrasonic pattern image data may be compared (1008). As a result of the comparison, it is determined whether the result data and the ultrasonic pattern image data match (1009), and if they match, it is recognized as a pre-stored fingerprint and fingerprint authentication is performed (1010). Matching the result data and the ultrasonic pattern image data may refer to matching more than the predetermined matching value.

According to the exemplary embodiments of the present invention, by comparing the information obtained through the ultrasonic sensor with the reference information and recognizing the fingerprint through a certain correction, it is possible to accurately identify the user even in rainy weather, improving user convenience.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The disclosed exemplary embodiments may be implemented in a form of a recording medium storing computer-executable instructions that are executable by a processor. The instructions may be stored in a form of a program code, and when executed by a processor, the instructions may generate a program module to perform operations of the disclosed exemplary embodiments. The recording medium may be implemented non-transitory as a non-transitory computer-readable recording medium.

The non-transitory computer-readable recording medium may include all types of recording media storing commands which may be interpreted by a computer. For example, the non-transitory computer-readable recording medium may be, for example, ROM, RAM, a magnetic tape, a magnetic disc, flash memory, an optical data storage device, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:
1. A vehicle comprising:
a first sensor;
a second sensor;
a storage configured to store pattern image data; and
a controller electrically connected to the first sensor, the second sensor and the storage and configured to:

wake up the second sensor in response to a user's touching the first sensor, obtain a fingerprint pattern image from the second sensor, according to a difference between an area value of a ridge area of the fingerprint pattern image and an area value of a valley area adjacent to the ridge area being less than a predetermined reference value, obtain result data by assigning a weight to the area value of the valley area so that the difference between the area value of the ridge area and the area value of the valley area in the fingerprint pattern image increases, and according to the result data and the pattern image data matching more than a predetermined matching value by comparing the result data and the pattern image data, recognize a fingerprint corresponding to the user, wherein the controller is configured to assign a greater weight to a valley area value of an internal region of the fingerprint pattern image than a valley area value of an external region of the fingerprint pattern image.

2. The vehicle according to claim 1,
wherein the first sensor is a capacitance sensor and the second sensor is an ultrasonic sensor, and
wherein the storage is configured to store the pattern image data, which are ultrasonic pattern images.

3. The vehicle according to claim 2, wherein the storage is configured to store at least one of water contact value pattern images and air contact value pattern images.

4. The vehicle according to claim 2, wherein the controller is further configured to assign the weight to the area value of the valley area corresponding to the difference between the area value of the valley area of the fingerprint pattern image and the area value of the ridge area being less than the predetermined reference value.

5. The vehicle according to claim 1, further including:
an inputter electrically connected to the controller and configured to receive the user's input to turn on a fingerprint recognition function of the controller,
wherein, according to the user's setting to wake up the fingerprint recognition function through the inputter, the controller is configured to receive the fingerprint pattern image from the second sensor.

6. The vehicle according to claim 1,
wherein the first sensor includes a first capacitance sensor and a second capacitance sensor; and
wherein the first sensor and the second sensor are spaced from a handle.

7. The vehicle according to claim 6,
wherein the first capacitance sensor is located inside the handle of the vehicle and configured for opening a door of the vehicle, and the second capacitance sensor is located outside the handle of the vehicle and configured for closing the door of the vehicle, and
wherein the controller is configured for waking up of the second sensor by detecting the user's touch to the first capacitance sensor and the second capacitance sensor.

8. A method of controlling a vehicle, the method comprising:
storing, by a storage, ultrasonic pattern image data;
waking up, by a controller electrically connected to the storage, a second sensor in a response to a user's touching a first sensor, wherein the first sensor and the second sensor are electrically connected to the controller;
obtaining, by the controller, a fingerprint pattern image of the user from the second sensor;
according to a difference between an area value of a ridge area of the fingerprint pattern image and an area value of a valley area adjacent to the ridge area being less than a predetermined reference value, obtaining, by the controller, result data by assigning a weight to the area value of the valley area so that the difference between the area value of the ridge area and the area value of the valley area in the fingerprint pattern image increases; and
according to the result data and the ultrasonic pattern image data matching more than a predetermined matching value by comparing the result data and ultrasonic pattern image data, recognizing, by the controller, a fingerprint corresponding to the user,
wherein the assigning of the weight includes assigning a greater weight to a valley area value of an internal region of the fingerprint pattern image than a valley area value of an external region of the fingerprint pattern image.

9. The method according to claim 8, further including: receiving, by an inputter electrically connected to the controller, the user's input to turn on a fingerprint recognition function of the controller; and according to the user's setting to wake up the fingerprint recognition function through the inputter, receiving, by the controller, the fingerprint pattern image from the second sensor.

10. The method according to claim 9,
wherein the first sensor includes a first capacitance sensor and a second capacitance sensor,
wherein the waking up of the second sensor include detecting the user's touch to the first capacitance sensor and the second capacitance sensor, and
wherein the first sensor and the second sensor are spaced from a handle.

11. The method according to claim 10,
wherein the first capacitance sensor is located inside the handle of the vehicle and configured for opening a door of the vehicle, and the second capacitance sensor is located outside the handle of the vehicle and configured for closing the door of the vehicle.

12. The method according to claim 8, wherein the storing of the ultrasonic pattern image data includes:
storing at least one of water contact value pattern images and air contact value pattern images in the storage.

13. The method according to claim 8, wherein the assigning of the weight further includes:
assigning the weight to the area value of the valley area corresponding to the difference between the area value of the valley area of the fingerprint pattern image and the area value of the ridge area being less than the predetermined reference value.

* * * * *